April 17, 1951 K. SIANG-KAN WU 2,549,715
FORWARD AND REVERSE GEARING FOR TRACTORS
Filed Nov. 18, 1947 3 Sheets-Sheet 2
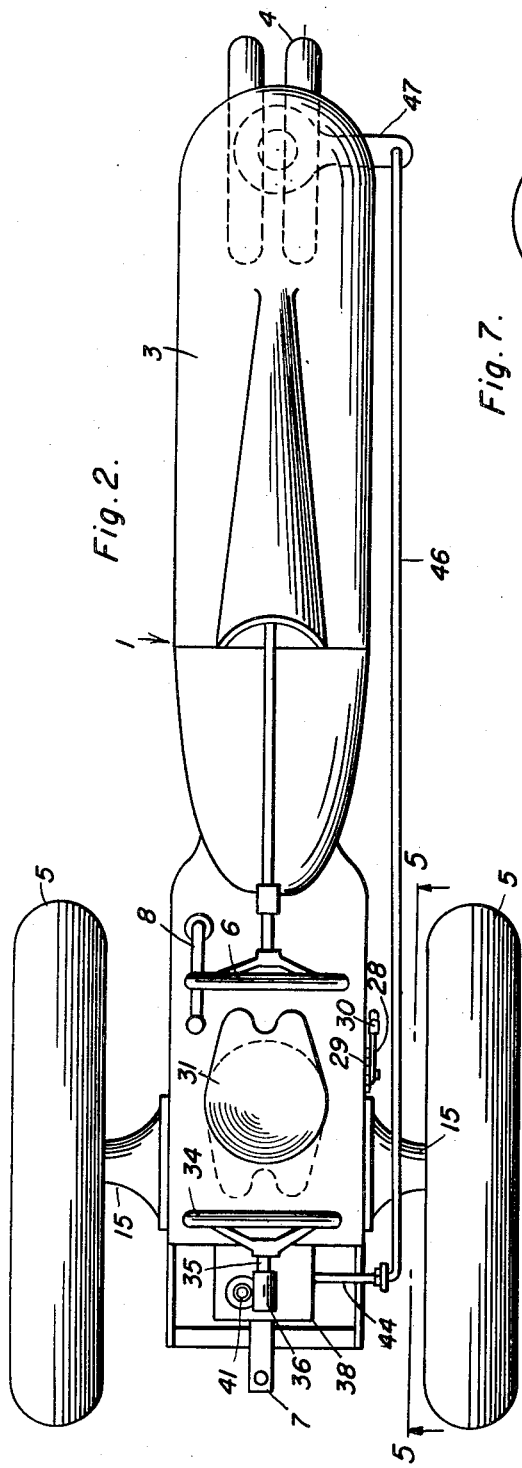
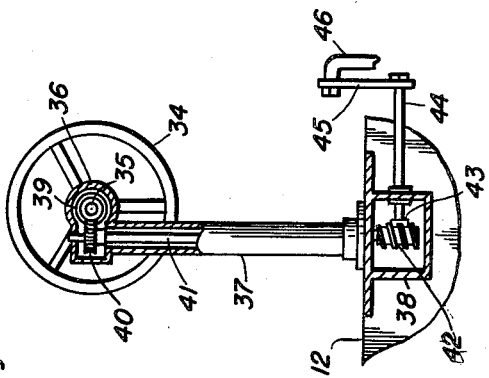
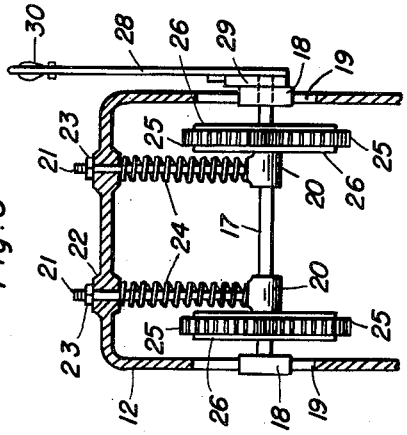
*Inventor*
Kenneth Siang-Kan Wu
By *Clarence A. O'Brien and Harvey B. Jacobson*
*Attorneys*

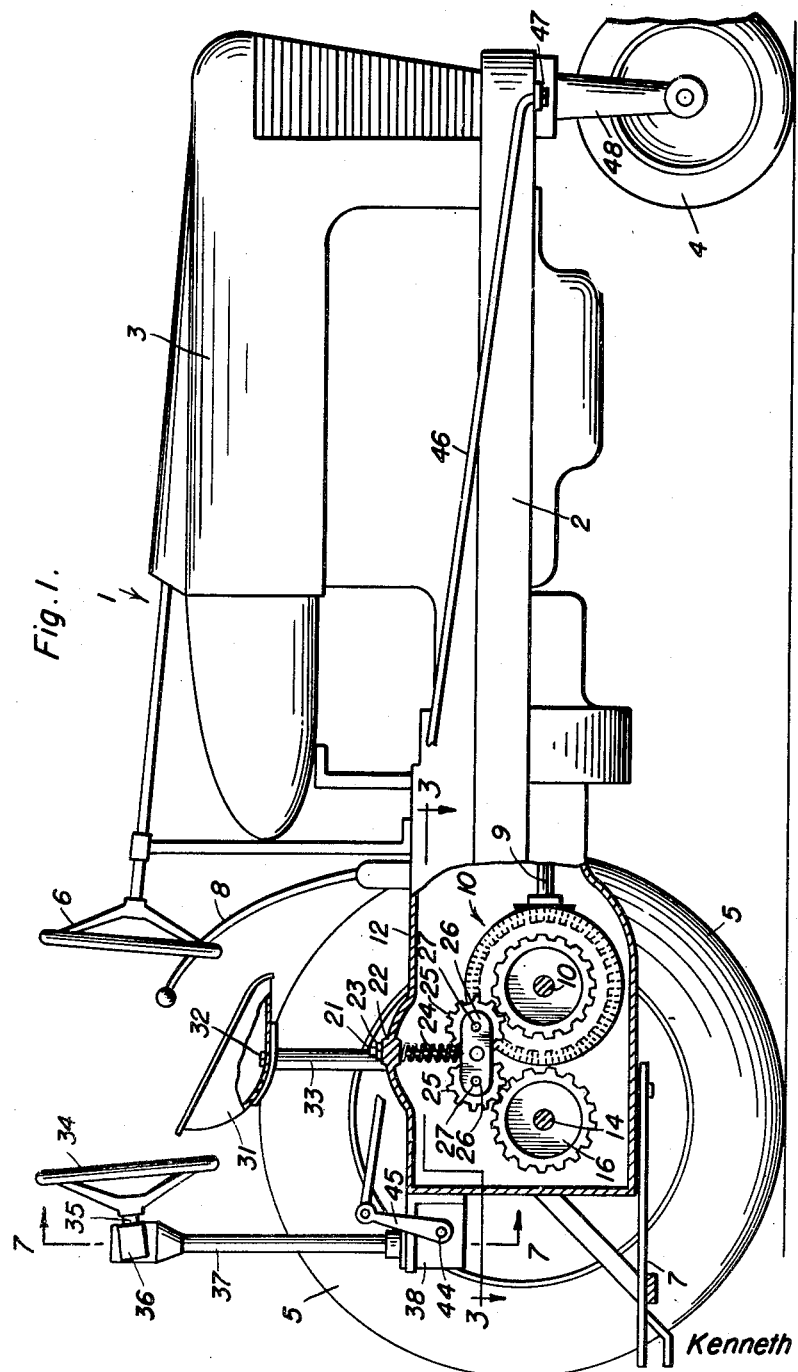

April 17, 1951 K. SIANG-KAN WU 2,549,715
FORWARD AND REVERSE GEARING FOR TRACTORS
Filed Nov. 18, 1947 3 Sheets-Sheet 3
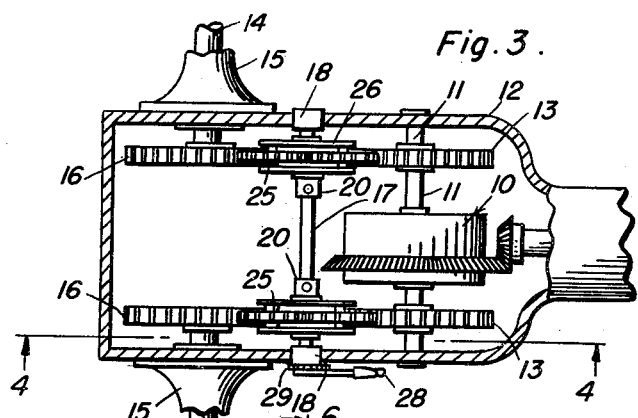
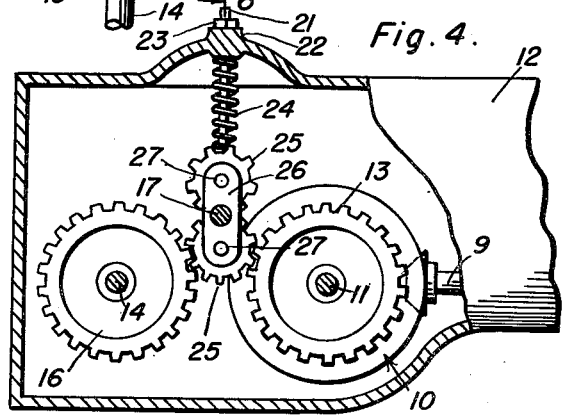
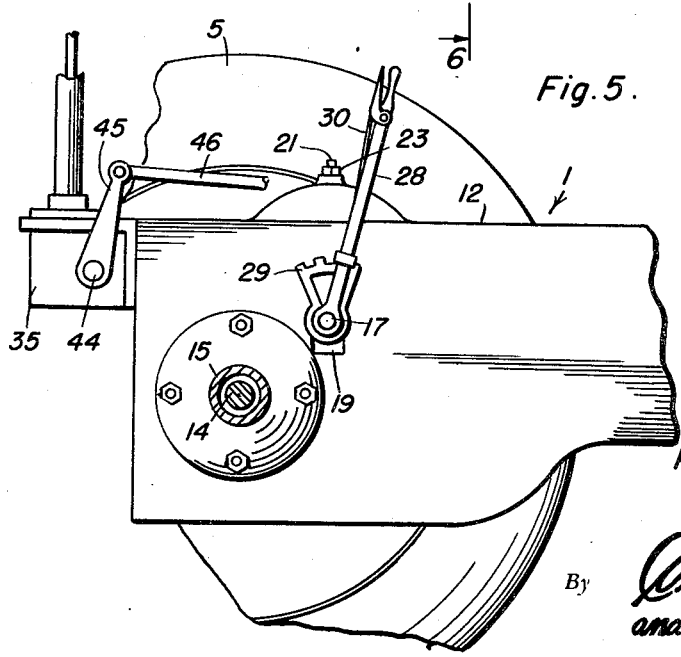
*Inventor*
Kenneth Siang-Kan Wu Patented Apr. 17, 1951

2,549,715

UNITED STATES PATENT OFFICE 2,549,715

FORWARD AND REVERSE GEARING FOR TRACTORS

Kenneth Siang-Kan Wu, Ames, Iowa

Application November 18, 1947, Serial No. 786,617

2 Claims. (Cl. 74—355)

My invention relates to improvements in farm tractors of the type provided with a rear end drawbar for towing agricultural implements.

The primary object of my invention is to equip tractors of the type above indicated for two-way driving whereby the same may be driven forwardly rear end foremost to push agricultural implements attached to the drawbar, or, driven in the usual manner to pull such implements, all with the driver facing in the direction of travel of the tractor and with steering means before the driver.

Another object is to accomplish the above by simple means and without materially adding to the cost of manufacture of such tractors, or to the upkeep thereof.

Other and subordinate objects, within the purview of my invention, together with the precise nature of my improvements will be readily understood when the succeeding description and claims are read with reference to the drawings accompanying and forming part of this specification.

In said drawings:

Figure 1 is a view in side elevation, partly broken away and shown in section, of a farm tractor equipped according to my invention in a preferred embodiment thereof;

Figure 2 is a view in plan;

Figure 3 is a fragmentary view in horizontal section taken on the line 3—3 of Figure 1;

Figure 4 is a fragmentary view in vertical longitudinal section taken on the line 4—4 of Figure 3;

Figure 5 is a fragmentary view in vertical section taken on the line 5—5 of Figure 2;

Figure 6 is a view in transverse section taken on the line 6—6 of Figure 4;

Figure 7 is a view in vertical transverse section taken on the line 7—7 of Figure 1.

Referring to the drawings by numerals, my improvements have been shown therein as forming part of the equipment of a well-known type of farm tractor 1, conventionally illustrated, as sufficient for the present purposes, the numeral 2 designating the chassis, 3 the power plant, 4 the dual front steering wheels, 5 the rear driving wheels, 6 the usual steering wheel, 7 the drawbar mechanism, and 8 the usual gear shift lever. As is well-known, such tractors are driven by a rear wheel drive including a power shaft 9 driving a differential 10 on a transversely split differential drive shaft 11 journalled transversely in a differential drive housing 12 and provided adjacent opposite ends thereof with a pair of driving gears 13 fastened thereon.

According to my invention, the usual separate rear axles 14 for the rear drive wheels 5, and which extend through and are suitably journalled in the usual axle housings 15 and in the differential drive housing 12 are equipped with a pair of driven gears 16 fast thereon and spaced rearwardly from the driving gears 13, said gears 13, 16 forming co-planar pairs and all of said gears 13, 16 being of the same diameter.

Intermediate the pairs of driving and driven gears 13, 16, within the differential drive housing 12 and above the axes of said gears is a transverse, sectional rock shaft 17 journalled at its ends in bearings 18 vertically slidable in guide slots 19 formed in opposite sides of the differential drive housing 12. The rock shaft 17 is also journalled in bearings 20 on the lower ends of a pair of hanger rods 21 slidably extending upwardly through guide bosses 22 on top of the differential drive housing 12.

Nuts 23 threaded onto the upper ends of said hanger rods 21 for turning against said bosses 22 provide for adjusting said hanger rods 21 and said rock shaft 17 upwardly.

Coil springs 24 on said hanger rods 21 interposed between the bearings 20 and said bosses 22 tension said rods, and said rock shaft 17, against upward adjustment.

Adjacent each end of the rock shaft 17 is a pair of like, meshing, tumbler gears 25 mounted in a yoke 26 to rotate on studs 27 in said yoke equidistantly spaced from the axis of the rock shaft 17.

The yokes 26 are formed as part of the rock shaft 17 in two side-by-side parts, as will be readily understood, which are secured together by the studs 27. The yokes 26 are arranged parallel on the said rock shaft 17.

The pairs of tumbler gears 25 are co-planar with the pairs of driving and driven gears 13, 16 and are adapted to be raised and lowered relative thereto by vertical adjustment of the hanger rods 21 and rock shaft 17 in a manner and for a purpose presently described.

A hand lever 28 fast on one end of the rock shaft 17 provides for rocking the same into either of two positions, in one of which the pairs of tumbler gears 25 are horizontally aligned in each pair, as shown in Figures 1 and 3, and in the other of which said pairs of gears 25 are vertically aligned in each pair as shown in Figures 4 and 6. A detent sector 29 on one bearing 18, and a detent 30 on said hand lever 28 provides for rocking the rock shaft 17 and locking the same in the different positions thereof.

Referring now to the use and operation of my invention as so far described, by adjusting the hanger rods 21 upwardly, through the medium of the nuts 23, the pairs of tumbler gears 25 may be raised sufficiently for the rock shaft 17 to be rocked into either of its two described positions. Then, by loosening the nuts 23, the hanger rods 21 and the rock shaft 17, will be lowered by the coil springs 24 so that, in the first described position of said rock shaft 17 with the pairs of tumbler gears 25 horizontally aligned in each pair, said pairs of gears will mesh with and operatively connect the pairs of driving and driven gears 13, 16 so that said pair of driven gears 16 will be rotated oppositely relative to the driving gears 13, as indicated by the arrows in Figure 1, and the tractor 1 will be driven forwardly front end foremost in the usual manner. However, in the second described position of the rock shaft 17, with the pairs of tumbler gears 25 vertically aligned in each pair, said gears will be lowered to mesh the lowermost gears 25 of the pairs with the pairs of driving and driven gears 13, 16 as shown in Figure 4, to operatively connect the driving gears 13 to the driven gears 16 to drive the tractor 1 forwardly rear end foremost. The meshing gears 25 of said pairs, in this instance, function as reversing gears, that is, as regards the lowermost gears 25, the uppermost gears 25 being idle.

A driver's seat 31 is provided in the rear of the steering wheel 6 and which is pivoted, as at 32, on a seat post 33 to swing around and face rearwardly of the tractor 1.

A steering wheel 34, for steering when the tractor 1 is being driven rear end foremost, is provided in rear of the seat post 33 and which is fast on a worm shaft 35 journalled in a worm housing 36 on the upper end of a hollow steering column 37 arising from and suitably fixed to another worm housing 38 suitably secured to the rear end of the differential drive housing 12.

A worm 39 on the worm shaft 35 meshes with a worm wheel 40 fast on the upper end of a vertical shaft 41 suitably journalled in said column 37.

A worm 42 fast on the lower end of said shaft 41 and in said housing 38 meshes with a worm wheel 43 on one end of a horizontal shaft 44 journalled in and extending out of said housing 38 at one side of the tractor 1.

A crank arm 45 fast on said shaft 41 is operatively connected by a rod 46, extending alongside the tractor 1, to a crank arm 47 and the fork 48 of the dual front steering wheels 4.

As will be understood, operation of the steering wheel 34 through the described connection to the fork 48 of the dual front steering wheel 4 serves to steer the tractor 1 from the rear end thereof when said tractor is travelling rear end foremost.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claims.

Having described the invention what is claimed as new is:

1. In a tractor having a pair of rear tractor wheels fast on separate aligned axles, a power drive for said axles including a pair of laterally spaced driving gears, a pair of driven gears fast on said axles and forming with said driving gears pairs spaced apart and co-planar in each pair, a pair of meshing tumbler gears associated with each pair of driving and driven gears, a rock shaft for revolving the pairs of tumbler gears into either of two positions in one of which said pairs of tumbler gears mesh, respectively, with the gears of the associated pairs and in the other of which one tumbler gear solely of each pair meshes with the pair of associated gears, means for manually rocking said shaft, and means for moving said shaft and tumbler gears away from said driving and driven gears for revolving of the tumbler gears into either position clear of said driving and driven gears, said means being operative to move said shaft and tumbler gears toward the driving and driven gears in either position of the tumbler gears to mesh said tumbler gears with the driving and driven gears.

2. In a tractor having a pair of rear tractor wheels fast on separate aligned axles, a power drive for said axles including a pair of laterally spaced driving gears, a pair of driven gears fast on said axles and forming with said driving gears pairs spaced apart and co-planar in each pair, a pair of meshing tumbler gears associated with each pair of driving and driven gears, a rock shaft for revolving the pairs of tumbler gears into either of two positions in one of which said pairs of tumbler gears mesh, respectively, with the gears of the associated pairs and in the other of which one tumbler gear solely of each pair meshes with the pair of associated gears, means for manually rocking said shaft, means for moving said shaft and tumbler gears away from said driving and driven gears for revolving of the tumbler gears into either position clear of said driving and driven gears, said means being operative to move said shaft and tumbler gears toward said driving and driven gears to mesh said tumbler gears with the driving and driven gears, and means for locking said shaft against being rocked during movement of the same and said tumbler gears away from and toward said driving and driven gears.

KENNETH SIANG-KAN WU.

REFERENCES CITED

The following references are of record in the file of this patent:

UNITED STATES PATENTS

| Number | Name | Date |
| --- | --- | --- |
| 668,769 | Break | Feb. 26, 1901 |
| 829,413 | Melotte | Aug. 28, 1906 |
| 1,189,378 | Mohr | July 4, 1916 |
| 1,233,945 | Wodsedalek | July 17, 1917 |
| 1,544,775 | Plocek | July 7, 1925 |
| 1,641,802 | Danly | Sept. 6, 1927 |
| 1,736,064 | Walker | Nov. 19, 1929 |

FOREIGN PATENTS

| Number | Country | Date |
| --- | --- | --- |
| 10,290 | Great Britain | Apr. 30, 1909 |
| 21,944 | Great Britain | Nov. 3, 1914 |
| 146,171 | Great Britain | June 25, 1920 |